Aug. 2, 1966    K. SILVON    3,263,717
TOP SHARPENING SAW CHAIN
Filed Sept. 23, 1963
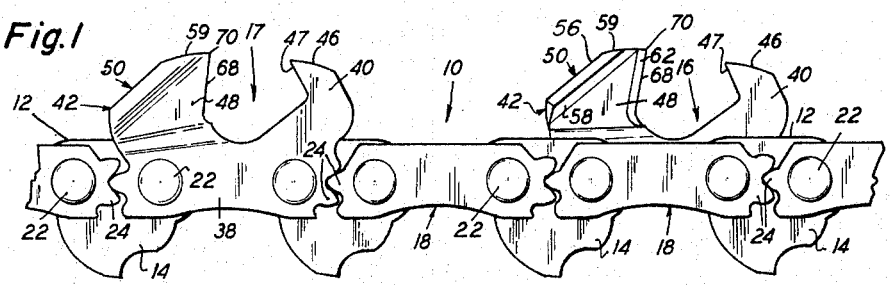
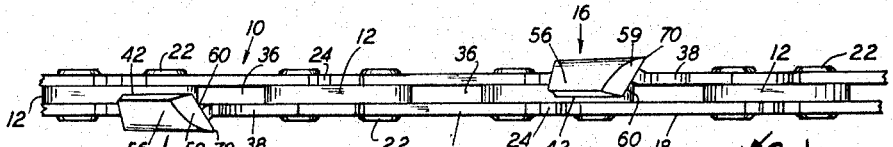
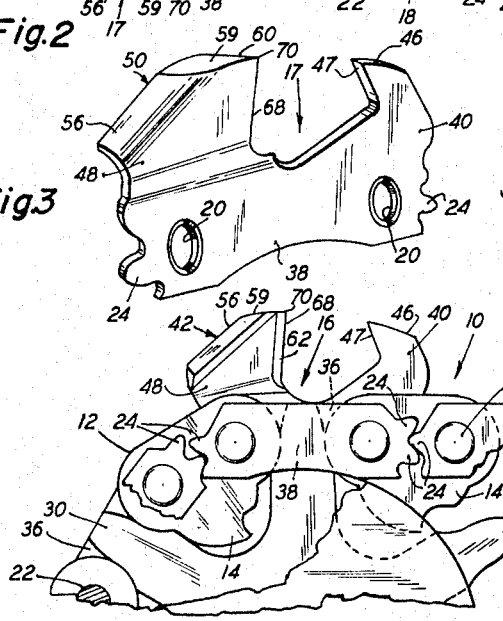
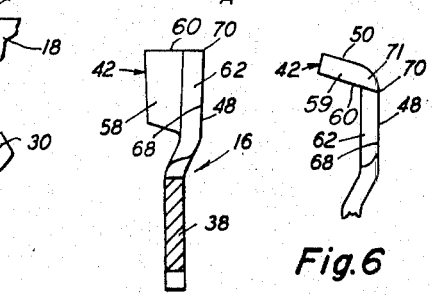
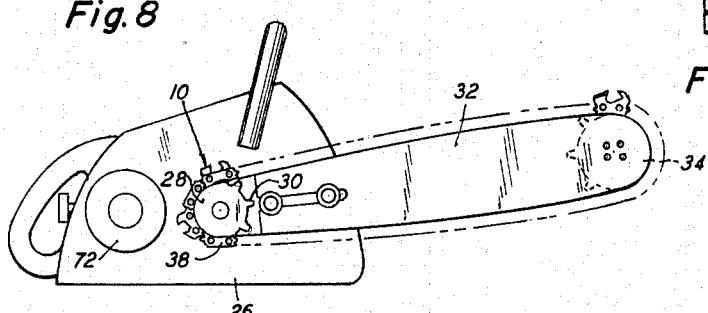
KAY SILVON
INVENTOR
BY
BUCKHORN, BLORE, KLARQUIST & SPARKMAN
ATTORNEYS United States Patent Office 3,263,717
Patented August 2, 1966

3,263,717
TOP SHARPENING SAW CHAIN
Kay Silvon, Portland, Oreg., assignor to Omark Industries, Inc., Portland, Oreg., a corporation of Oregon
Filed Sept. 23, 1963, Ser. No. 310,757
12 Claims. (Cl. 143—135)

The present invention relates to saw chains and more particularly to a top sharpening saw chain having cutter links each with a top sharpened cutting element and a depth gauge, with the depth gauge shaped and arranged on the cutter link so that a predetermined clearance between the outer cutting edge of the cutting element and the outer end of the depth gauge is maintained automatically through repeated resharpenings of the cutting element and throughout substantially the entire life of the chain.

Saw chains which can be sharpened by sharpening devices attached to the chain saw while the chain is driven about the periphery of the chain saw bar are known in the prior art and are usually called self sharpening chains. Although some prior art top sharpening chains have included cutter links with integral depth gauges, the configuration and placement of such depth gauges on their cutter links have had no correlation to the configuration and positioning of their associated cutting elements so that after a relatively few resharpenings of the top sharpened cutting elements, the preset clearances between the outer cutting edges of the cutting elements and the outer ends of their associated depth gauges would disappear, necessitating periodic handgrinding or filing of the depth gauges to re-establish the preset clearance. The present invention provides a new top sharpening chain in which the cutter links are provided with depth gauges which are so shaped and arranged relative to their associated cutting elements that regardless of the number of resharpenings the predetermined clearance between the cutting elements and their depth gauges will be maintained throughout substantially the entire life of the chain. The present invention is applicable to all types of top sharpening chains regardless of the specific configuration of the cutting elements thereof.

In accordance with the present invention, each cutter link of the saw chain has an integral cutting element including a laterally extending forwardly and outwardly inclined top plate or toe at the outer end of a shank or side plate extending outwardly from and offset laterally from the cutter link body rearwardly of the midpoint of an imaginary straight line joining a pair of pivot axes on the link body. An integral depth gauge projects outwardly from the link body forwardly of the midpoint of such line and has an outer trailing edge positioned forwardly of the midpoint of such line a greater distance than the cutting edge of the cutting element is positioned rearwardly of such midpoint. Both the cutting element and the depth gauge have convex arcuate outer surfaces of the same radius of curvature and concentric about a common axis parallel to the pivot axis of the link body and in a plane through such midpoint, with such plane being perpendicular to the line joining the pivot axes. The depth gauge is characterized by a rear edge surface that is inclined inwardly and forwardly from its outer trailing edge in a direction toward the link body so that a predetermined clearance between the cutting edge and the trailing edge of the depth gauge is maintained as the distance of the outer cutting edge rearwardly of the midpoint is increased through repeated resharpenings of the top sharpened cutter element. The cutting element can be sharpened by moving the outer surface of the top plate relative to and in contact with the surface of a sharpening element of a sharpening device carried by a chain saw while the chain is on the chain saw and being driven by the chain saw motor, and the height of the associated depth gauge will at the same time be reduced through contact of the outer depth gauge surface with the same sharpening element, with the reduction being such that the pre-existing clearance between the outer cutting edge of the cutter element and the outer trailing edge of the depth gauge is maintained.

An object of the invention is, therefore, to provide an improved top sharpening saw chain with cutter links having a cutting element which is adapted to be top sharpened and an integral depth gauge which is so positioned and formed with respect to the cutting element that as the height of the outer cutting edge of the cutting element is reduced through repeated presharpenings, the height of the depth gauge will be reduced accordingly, so as to maintain a substantially constant clearance between the outermost portion of the depth gauge and the outer cutting edge of the cutting element.

A more specific object of the invention is to provide a cutter link having a depth gauge as aforesaid and which further includes a cutting element including a top plate.

Another specific object is to provide a saw chain including a top sharpening cutter link with a depth gauge as aforesaid wherein the cutting element includes both a kerf side cutting edge and a kerf bottom cutting edge.

Other objects and advantages of the present invention will be apparent from the following description given in connection with the accompanying drawings, of which:

FIG. 1 is a side elevational view of a length of saw chain in accordance with the present invention;

FIG. 2 is a top plan view of the saw chain of FIG. 1;

FIG. 3 is an isometric view on an enlarged scale of a right cutter link of the saw chain of FIG. 1;

FIG. 4 is a side elevation view of a left cutter link on a further enlarged scale;

FIG. 5 is a sectional view taken along the line 5—5 of FIG. 4;

FIG. 6 is a fragmentary view taken along the line 6—6 of FIG 4;

FIG. 7 is a side elevational view of a saw chain in accordance with the invention on a reduced scale and in position on a chain saw equipped with a sharpening device; and FIG. 8 is a fragmentary side elevation on an enlarged scale showing a portion of the saw chain and driving sprocket with parts broken away to more clearly show the structure.

With reference to the drawings, FIG. 1 illustrates a saw chain 10 having longitudinally spaced apart center drive links 12 including downwardly projecting root or guide portions 14, left and right side cutter links 16 and 17, respectively, and side connector links 18. Each side link has a pair of rivet holes 20 (FIG. 4) therethrough for receiving pivot pins in the form of rivets 22 which pivotally connect together adjacent links.

Each side link of the chain 10, including the connecting links 18 and cutter links 16 and 17, has leading and trailing ends formed with gear teeth 24 which interengage mating gear teeth of the abutting ends of forwardly and rearwardly adjacent side links. The gear teeth at each end of each side link are arranged along an arc, the center of which is coincident with the center of the rear rivet hole 20 of the link. This arrangement enables such links to travel in a curved path around the periphery of a saw bar. As discussed below this assists in the sharpening of the saw chain while in position on a saw chain or sprocket and stabilizes the action of the saw chain.

Referring to FIG. 7, the chain 10 of the present invention is shown in position on a chain saw 26 provided with a sharpening device. A drive sprocket 28 having radially extending teeth 30 is positioned on the saw adjacent the rear or inner end of a saw bar 32. An idler sprocket 34 of larger pitch radius than the drive sprocket 28 may be mounted at the nose end of the saw bar 32. The sprocket 34 reduces friction at the nose end of the saw bar although the chain of the present invention may be employed with a conventional saw bar in which the side rails and groove for the saw chain extend around the nose of the bar.

The center links 12 of the chain are considerably shorter in length than the side links 18, and the rivet holes of the center links are spaced more closely together than the rivet holes 20 of the side links so as to provide gaps 36 between adjacent ends of adjacent center links. These gaps receive the drive sprocket teeth 30, which are sufficiently long to extend upwardly between adjacent center links and engage the rear ends of the center link bodies between the side link and outwardly of the axis of the sprocket from the roots or guide portion 14. Since the points of application of the driving force of the drive sprocket teeth are approximately in line with the centers of the rear rivet holes of the center links, any tendency of the driving force to rotate the center links about their pivotal connection to the side links is largely eliminated. This manner of driving a saw chain may be referred to as "pitch line drive" and also assists in stabilizing the action of the saw chain, thus assisting in the sharpening of the saw chain while in position on the chain saw.

As stated above, all of the cutter links 16 and 17 are identical except for being of alternate left and right configuration. Corresponding parts on the right and left cutter links will, therefore, be given the same reference numerals. With reference to FIGS. 3 and 4, each cutter link has a body 38, an integral depth gauge 40 projecting outwardly from the forward end portion of the body and a cutting element 42 projecting outwardly from the rear portion of the body. All cutting edges on the cutter element are positioned rearwardly of the midpoint 43 of a line 44 connecting the centers, or pivot axes, 45 of the rivet holes 20 of the cutter link as is evident from FIG. 4. The depth gauge 40 has an outer kerf bottom engaging edge surface 46 which curves outwardly and rearwardly from its front end to its rear end. All portions of this surface, including the outer trailing end 46a thereof, are positioned forwardly of the midpoint 43 a greater distance than the cutting edges, including the outer cutting edge 60, of the cutter element are positioned rearwardly of the midpoint as described in more detail below. The depth gauge 40 also has a rear edge surface 47 which is inclined outwardly and rearwardly at a greater angle to the line 44 than the curved outer edge surface 46.

The cutting element 42 includes a shank or side plate 48 extending outwardly of the cutter link body 38 in the same general direction as the depth gauge 40. The shank is laterally offset from the body 38 in a direction away from the longitudinal median plane of the chain and extends laterally and outwardly at a small angle, for example 5°, with respect to the body. The top plate 50 is a continuation of the shank and is bent laterally toward and across the longitudinal median plane of the chain so as to extend over the body and terminate on the opposite side of the median plane from the remainder of the cutter link.

Longitudinally of the chain the top plate is inclined at a steep angle, for example an angle of about 40° to the line 44, rearwardly from its forward end and inwardly toward the body 38. The top plate includes a broad flattened rearwardly and outwardly directed face 56 and an opposite forward surface 58, both of which are inclined rearwardly and inwardly at the steep angle referred to above. The cutter element 42 also has an outer surface 59 curved rearwardly and inwardly from the forward face 58 to the rearward face 56 so as to define an outer top plate or toe cutting edge 60 at the intersection of the outer surface 59 and the forward surface 58 for cutting the bottom wall of the kerf. The outer surfaces 46 and 59 of the depth gauge and cutter element, respectively, are convexly curved longitudinally of the saw chain and are described by the same radius of curvature R so as to be portions of the same circular arcuate surface 61 which in the specific structure shown is a circular cylindrical surface. Such cylindrical surface has its axis A normal to the longitudinal median plane P of the saw chain and in a plane normal to and bisecting the line 44 joining the rivet holes 20 of the cutter link so as to pass through the midpoint 43 of the line 44. When the chain is sharpened on a chain saw, the axis A of the cylindrical surface 61 is coincident with the axis of the driving sprocket of the saw chain. The cutting edge 60 is positioned outwardly from the line 44 a greater distance than any other portion of the chain including the outer trailing edge 46a of surface 46 on the depth gauge 40.

It will be noted that the inclination of the top plate with respect to the longitudinal path of travel of the chain, or the line 44 joining the centers of the rivet holes 20, is sufficient that the outer surface 59 may be curved inwardly and rearwardly to provide clearance for the cutting edge 60 while leaving a cutting edge of sufficient strength that it is not easily chipped or otherwise damaged. In the illustrated cutter link the angle of inclination of the top plate is approximately 40°, although this angle may vary over a considerable range.

The shank or side plate 48 of the cutting element has its forward edge beveled rearwardly and laterally from its side remote from the median plane of the chain to provide a beveled surface 62 which intersects such side of the cutting element to define a shank or side plate cutting edge 68 at the front edge of the shank for cutting the side of the kerf. The shank cutting edge 68 and top plate cutting edge 60 are continuous and meet at a well defined, sharp cutting corner 70. The corner 70 is positioned laterally a greater distance from the median plane of the chain than the remaining portions of the shank and top plate and is positioned forwardly of the remaining portions of the top plate cutting edge 60. Thus the shank or side plate cutting edge 68 is inclined outwardly and forwardly toward the corner 70 as shown in FIGS. 1 and 4, and also laterally toward the median plane of the chain and inwardly from the corner 70 as shown in FIG. 5.

As most clearly shown in FIG. 5, the outer surface 59 of the top plate extends substantially at right angles to the link body so that the top plate cutting edge 60 and shank or side plate cutting edge 68 intersect at very nearly a right angle. It will be noted from FIG. 6, however, that the top plate 56 is bent at an angle less than 90° with respect to the shank 48; that is, the top plate intersects the longitudinal median plane of the chain at an obtuse angle of about 105°. The result is that the cutting edge 60 is inclined rearwardly and laterally from the corner 70 at the intersection of the cutting edges 70 and 60, such inclination being most clearly shown in FIG. 2. The angle of the top plate 56 with respect to the median plane of the chain can be varied through a considerable range to vary the lateral inclination of the cutting edge 60. The structure above described results in the sharp cutting corner 70, also discussed above, even though the top plate 50 and the shank 48 are joined by a curved portion 71.

A major advantage of the cutter link described above is that it can be sharpened by a sharpening device attached to a chain saw while the saw chain, of which it is a part, travels about the periphery of the chain saw bar. One suitable form of sharpening device is shown in FIG. 7, and includes a grinding wheel 72 positioned on a chain saw rearwardly of and adjacent the drive sprocket 28 with the median plane of the wheel coincident with the median plane of the sprocket and saw chain. The sharpening wheel is mounted on an auxiliary drive shaft of the chain saw and is driven by the motor of the chain saw. The sharpening wheel 72 is movable toward the drive sprocket 28 so that in an operative position its peripheral surface engages the outer surfaces 59 of the cutter elements 42 thereby sharpening the top plate cutting edges.

The peripheral surface of the sharpening wheel 72 also engages the outer edge surfaces 46 of the depth gauges but because the depth gauge outer surfaces are positioned forwardly of the midpoints 43 of their respective link bodies a greater distance than the outer cutting edges 60 are positioned rearwardly from the midpoints 43, and because the rear edge surfaces 47 of the depth gauges are inclined inwardly and forwardly whereas the forward surfaces 58 of the cutting elements are inclined inwardly and rearwardly, the depth gauges are maintained at a level inwardly of the cutting edges 60, even after numerous resharpenings. In this respect, the pitch radius of the drive sprocket 28 is preferably less than the pitch radius of the nose idler sprocket 34, or of the nose of the saw bar if no idler sprocket is used, so that the sharpening arc of the cutter links on the sprocket will be less than the cutting arc thereof at the nose end of the bar. Thus the top plate cutting edge 60 will have cutting clearance and also will be positioned outwardly of the depth gauge in so-called "boring" operations in which the nose end of the saw bar is thrust into the wood to make a cut, as well as in the more usual slicing operations in which the side edge of the bar is used.

Although only the top plate cutting edges 60 of the cutting elements 42 are sharpened by sharpening the chain while it is on the chain saw, an outer portion of the shank cutting edge 68 is also removed to restore the sharp cutting corner 70. Since a very short length only of the shank cutting edge 68 just below the cutting corner 70, actually performs a cutting operation, the chain may be maintained sharp and in excellent cutting condition by the sharpening device on the chain saw for extended periods of time when subjected to normal use.

The gear teeth 24 and the pitch line drive of the chain both contribute to accurate sharpening of the chain of the present invention as well as improved cutting action of the chain, since both tend to prevent independent and erratic rotation of the cutter links about the axes of their pivotal connections to the other links of the chain. These two features combine to effectively lock the cutter links rigidly in position relative to a sprocket while they are traveling around a sprocket so that accurate sharpening can be accomplished on a sprocket and an idler sprocket at the nose of the bar results in an improved boring operation. While the gear toothed side links and pitch line drive of the illustrated saw chain are especially advantageous in combination with the present form of cutter tooth to stabilize the chain during sharpening and cutting, it is apparent that the cutter links of the present invention may be provided with conventional link bodies without gear teeth, or may form part of a chain adapted for the more common type of center link drive in which the roots or guide portions of the center links have driving engagement with the teeth of a drive sprocket. Also it is apparent that the gear teeth on the side links are operative to stabilize the operation of chain saws having conventional cutter links and this subject matter is claimed in my copending application Serial No. 310,773, filed September 23, 1963.

Having illustrated and described a preferred embodiment of the invention, it should be apparent to those skilled in the art that the invention permits of modification and arrangement and detail. I claim as my invention all such modifications as come within scope of the appended claims.

I claim:

1. A cutter link for a top sharpening chain comprising:
   a cutter link body having means for pivotally connecting the cutter link to other links about forward and rearward pivotal axes,
   an integral cutting element projecting outwardly from the rearward portion of the body,
   said cutting element including a shank extending outwardly from the body and having a portion offset laterally with respect to the body and a top plate forming a continuation of the outer portion of the shank and bent laterally over the body and terminating on the side of the body opposite the shank and being joined to the shank by a curved portion forming a continuation of the shank,
   said top plate extending longitudinally of the cutter link and being inclined forwardly and outwardly from the rearward end to the forward end of said top plate and having similarly inclined forward and rearward faces,
   said top plate also having an outer surface at said forward end extending rearwardly and inwardly from said forward face to said rearward face providing a laterally extending forwardly directed kerf bottom cutting edge at the intersection of the outer surface and said forward face,
   said shank having a forwardly directed kerf side cutting edge extending outwardly along the forward portion of said shank and intersecting the kerf bottom cutting edge and a sharp cutting corner,
   and a depth gauge projecting outwardly from the forward end of said cutter link and having an outer edge surface extending outwardly and rearwardly from the front portion to the rear portion of the depth gauge,
   said outer surfaces on the top plate and depth gauge being part of a cylindrical surface having an axis normal to the median plane of said body and in a plane normal to the line joining said pivotal axis and through said midpoint,
   all portions of said outer surface on the depth gauge being positioned forwardly of said midpoint a greater distance than said cutting corner is positioned rearwardly of said midpoint,
   said kerf side cutting edge being inclined inwardly and rearwardly from said cutting corner and said depth gauge having a rear edge inclined inwardly and forwardly from said outer edge surface.

2. A cutter link for a top sharpening chain comprising:
   a cutter link body having means for pivotally connecting the cutter link to other links about forward and rearward pivotal axes,
   an integral cutting element projecting outwardly from the rearward portion of the body,
   said cutting element having a forwardly directed kerf side cutting edge extending outwardly along its forward portion and terminating in a sharp cutting corner and having an outer surface curved rearwardly and inwardly from said corner,
   and a depth gauge projecting outwardly from the forward portion of the body and having a rearward edge and an outer surface curved forwardly and inwardly from said forward edge,
   said outer surfaces being part of a circular arcuate surface having an axis normal to the median plane of said body and in a plane normal to the line joining said pivotal axes and through the midpoint of said line,
   said cutting corner being positioned rearwardly of said midpoint and all portions of said outer surface of the depth gauge being positioned forwardly of said midpoint a greater distance than said corner is positioned rearwardly of said midpoint,
   said kerf side cutting edge being inclined inwardly and rearwardly from said corner and said rearward edge of said depth gauge being inclined inwardly and forwardly from said outer surface of said depth gauge at a greater angle than said kerf side cutting edge is inclined.

3. A top sharpening saw chain comprising:
   center links and side links including right and left cutter links pivotally connected to the center links about pivot axes spaced longitudinally of the side and center links, each of said cutter links including a cutter link body
and an integral cutting element projecting outwardly
from the rearward portion of the body,
said cutting element including a shank extending outwardly from the body and having a portion offset laterally with respect to the body and a top plate forming a continuation of the outer portion of the shank and bent laterally over the body and terminating on the side of the body opposite the shank and being joined to the shank by a curved portion forming a continuation of the shank,
said top plate extending longitudinally of the cutter link and being inclined forwardly and outwardly from the rearward end to the forward end of said top plate and having similarly inclined forward and rearward faces,
said top plate also having an outer surface at said forward end extending rearwardly and inwardly from said forward face to said rearward face providing a laterally extending forwardly directed kerf bottom cutting edge at the intersection of the outer surface and said forward face,
said shank having a forwardly directed kerf side cutting edge extending outwardly along the forward portion of said shank and intersecting the kerf bottom cutting edge in a sharp cutting corner,
and a depth gauge projecting outwardly from the forward end of said cutter link and having an outer edge surface extending outwardly and rearwardly from the front portion to the rear portion of the depth gauge,
said outer surfaces on he top plate and depth gauge being part of a cylindrical surface having an axis normal to the median plane of said body and in a plane normal to the line joining said pivotal axis and through said midpoint,
all portions of said outer surface on the depth gauge being positioned forwardly of said midpoint a greater distance than said cutting corner is positioned rearwardly of said midpoint,
said kerf side cutting edge being inclined inwardly and rearwardly from said cutting corner and said depth gauge having a rear edge inclined inwardly and forwardly from said outer edge surface.

4. A top sharpening saw chain comprising:
center links and side links including right and left cutter links pivotally connected to the center links about pivot axes spaced longitudinally of the side and center links,
each of said cutter links including a cutter link body and an integral cutting element projecting outwardly from the rearward portion of the body,
said cutting element having a forwardly directed kerf side cutting edge extending outwardly along its forward portion and terminating in a sharp cutting corner and having an outer surface curved rearwardly and inwardly from said corner,
and a depth gauge projecitng outwardly from the forward portion of the body and having a rearward edge and an outer surface curved forwardly and inwardly from said rearward edge,
said outer surfaces being part of a circular arcuate surface having an axis normal to the median plane of said body and in a plane normal to the line joining said pivotal axes and through the midpoint of said line,
said cutting corner being positioned rearwardly of said midpoint and all portions of said outer surface of the depth gauge being positioned forwardly of said midpoint a greater distance than said corner is positioned rearwardly of said midpoint,
said rearward edge of said depth gauge being inclined inwardly and forwardly from said outer surface of said depth gauge.

5. A top sharpening saw chain comprising:
center links and side links including right and left cutter links pivotally connected to the center links about pivot axes spaced longitudinally of the side and center links,
each of said cutter links including a cutter link body and an integral cutting element projecting outwardly from the rearward portion of the body,
said cutting element having a forwardly directed kerf side cutting edge extending outwardly along its forward portion and terminating in a sharp cutting corner and having an outer surface curved rearwardly and inwardly from said corner,
and a depth gauge projecting outwardly from the forward portion of the body and having a rearward edge and an outer surface curved forwardly and inwardly from said rearward edge,
said outer surfaces being part of a circular arcuate surface having an axis normal to the median plane of said body and in a plane normal to the line joining said pivotal axes and through the midpoint of said line,
said cutting corner being positioned rearwardly of said midpoint and all portions of said outer surface of the depth gauge being positioned forwardly of said midpoint a greater distance than said corner is positioned rearwardly of said midpoint,
said kerf side cutting edge being inclined inwardly and rearwardly from said corner and said rearward edge of said depth gauge being inclined inwardly and forwardly from said outer surface of said depth gauge at a greater angle than said kerf side cutting edge is inclined.

6. A top sharpening saw chain comprising:
center links and side links including right and left cutter links pivotally connected to the center links about pivot axes spaced longitudinally of the side and center links,
each of said cutter links including a cutter link body and an integral cutting element projecting outwardly from the rearward portion of the body,
said cutting element including a shank extending outwardly from the body and having a portion offset laterally with respect to the body and a top plate forming a continuation of the outer portion of the shank and bent laterally over the body and terminating on the side of the body opposite the shank and being joined to the shank by a curved portion forming a continuation of the shank, said top plate extending longitudinally of the cutter link and being inclined forwardly and outwardly from the rearward end to the forward end of said top plate and having similarly inclined forward and rearward faces,
said top plate also having an outer surface at said forward end extending rearwardly and inwardly from said forward face to said rearward face providing a laterally extending forwardly directed kerf bottom cutting edge at the intersection of the outer surface and said forward face,
said shank having a forwardly directed kerf side cutting edge extending outwardly along the forward portion of said shank and intersecting the kerf bottom cutting edge in a sharp cutting corner,
and a depth gauge projecting outwardly from the forward end of said cutter link and having an outer edge surface extending outwardly and rearwardly from the front portion to the rear portion of the depth gauge,
said outer surfaces on the top plate and depth gauge being part of a cylindrical surface having an axis normal to the median plane of said body and in a plane normal to the line joining said pivotal axis and through said midpoint.
all portions of said outer surface on the depth gauge being positioned forwardly of said midpoint a greater distance than said cutting corner is positioned rearwardly of said midpoint, said kerf side cutting edge being inclined inwardly and rearwardly from said cutting corner and said depth gauge having a rear edge inclined inwardly and forwardly from said outer edge surface, said side links each having gear teeth on their forward and rearward ends meshing with similar gear teeth on longitudinally adjacent side links, said center links being longitudinally spaced to provide gaps between said center links to receive the teeth of a chain saw sprocket in driving contact with said center links substantially in alignment with pivot axes longitudinally of said chain.

7. A top-sharpening saw chain having a cutter link comprising, a cutter link body having a forward end and a rear end and having means defining a pair of longitudinally spaced-apart parallel pivot axes normal to said link body adjacent said forward and rear ends, a cutting element projecting outwardly from said link body rearwardly of the midpoint of an imaginary straight line joining said pivot axes, said cutting element having an arcuately curved outer surface and a forward surface inclined rearwardly and downwardly from an intersection with the forward end of said outer surface, said intersection defining a kerf-cutting edge, an integral depth gauge projecting outwardly from said link body forwardly of the midpoint of said line, said depth gauge having an arcuately curved outer surface and a rear surface inclined forwardly and downwardly from an intersection with the rear end of said outer depth gauge surface, said arcuate outer surface of said cutting element and said arcuate outer surface of said depth gauge lying in a common imaginary cylindrical surface whose axis of curvature lies in a plane normal to said line joining said pivot axes and passing through said midpoint, said depth gauge intersection being spaced forwardly of said plane a greater distance than the most forward extremity of said cutting edge is spaced rearwardly of said plane so that said cutting edge has a predetermined outward clearance relative to said depth gauge intersection when said cutter link is traveling in a straight path, the forward inclination of said rear depth gauge surface being related to the rearward inclination of said forward cutting element surface so that said clearance is maintained substantially constant as the distances between said cutting element and depth gauge outer surfaces and said line joining the pivot axes are reduced by grinding said arcuate outer surfaces in an arcurate path about said axis of curvature.

8. A saw chain according to claim 7 wherein said cutter link has a cutting element comprising, a shank portion extending outwardly from said cutter link body and being offset laterally on one side of said body, and a top plate forming a continuation of the outer portion of said shank and being bent laterally over the body and terminating on the side of said body opposite said one side, said top plate extending longitudinally of said link body and being inclined forwardly and outwardly of said body from the rearward end to the forward end thereof, said outer cutting element surface being provided on the forward outer end of said top plate, said forward cutting element surface being provided on the forwardly and inwardly directed surface of said top plate so that the intersection of said forward outer end and said forwardly and inwardly directed surface of said top plate defines a laterally extending kerf bottom cutting edge.

9. A saw chain according to claim 8 wherein said shank portion includes a forward end edge beveled rearwardly to define a kerf sidewall cutting edge, said kerf sidewall cutting edge intersecting said kerf bottom cutting edge at a sharp cutting corner.

10. A saw chain according to claim 7 wherein the link body of said cutter link has a forward end and a rear end each defining a gear segment for meshing with mating gear segments of longitudinally adjacent links of said saw chain.

11. A saw chain according to claim 8 wherein the link body of said cutter link has a forward end and a rear end each defining a gear segment for meshing with mating gear segments of longitudinally adjacent links of said saw chain.

12. A saw chain cutter link for use in a saw chain which can be sharpened while mounted upon a chain saw and while being positioned on and driven by the chain saw sprocket, comprising:

a link body having forward and rear ends and having means defining parallel pivot axes spaced from each other longitudinally of said link, a cutter element projecting outwardly from the rear of said body and having on its outer portion a forwardly projecting cutting edge positioned rearwardly of the midpoint of the line joining said pivot axes, a depth gauge element projecting outwardly from the front of said body in the same direction as said cutter element and a lesser distance from said line joining said pivot axes than said cutter element, said depth gauge element being spaced from said cutter element forwardly of said body and having its outer trailing edge positioned forwardly of said midpoint a greater distance than said cutting edge is positioned rearwardly of said midpoint, each of said cutter and depth gauge element terminating at its outer end in a convex arcuate surface, the arcuate surfaces of both said elements having substantially the same radius of curvature and being concentric about a common axis parallel to said pivot axes and in a plane through said midpoint, said plane being perpendicular to said line joining said pivot axes, said depth gauge element including a rear edge surface inclined inwardly and forwardly from said outer trailing edge so as to maintain a clearance between said cutting edge and the outer trailing edge of said depth gauge as the distance of said cutting edge rearwardly of said midpoint is increased through sharpening of said cutter element subsequent to the initial sharpening thereof.

References Cited by the Examiner

UNITED STATES PATENTS 3,180,001  4/1965  Nash _____ 74—250
3,189,064  6/1965  Fredrickson _____ 143—135

DONALD R. SCHRAN, *Primary Examiner.*